United States Patent
Marhoefer et al.

(10) Patent No.: US 9,943,085 B2
(45) Date of Patent: Apr. 17, 2018

(54) FONDANT HAVING A NON-CRYSTALLINE PHASE COMPRISING ISOMALTULOSE AND SUCROSE

(71) Applicant: SUEDZUCKER AG, Mannheim (DE)

(72) Inventors: Stephan Marhoefer, Gundheim (DE); Joerg Bernard, Albsheim (DE)

(73) Assignee: SUDZUCKER AG, Mannheim (DE)

( * ) Notice: Subject to any disclaimer, the term of this patent is extended or adjusted under 35 U.S.C. 154(b) by 0 days.

(21) Appl. No.: 14/431,159

(22) PCT Filed: Sep. 23, 2013

(86) PCT No.: PCT/EP2013/069688
§ 371 (c)(1),
(2) Date: Mar. 25, 2015

(87) PCT Pub. No.: WO2014/048867
PCT Pub. Date: Apr. 3, 2014

(65) Prior Publication Data
US 2015/0237883 A1    Aug. 27, 2015

(30) Foreign Application Priority Data
Sep. 28, 2012 (EP) ..................................... 12006805

(51) Int. Cl.
*A23G 3/50* (2006.01)
*A23G 3/42* (2006.01)
*A23G 3/54* (2006.01)
*A23G 3/34* (2006.01)

(52) U.S. Cl.
CPC .............. *A23G 3/343* (2013.01); *A23G 3/42* (2013.01); *A23G 3/54* (2013.01)

(58) Field of Classification Search
CPC ................................... A23G 3/343; A23G 3/42
See application file for complete search history.

(56) References Cited

U.S. PATENT DOCUMENTS

2013/0309370 A1* 11/2013 Walter .................. A23G 3/343
426/103

FOREIGN PATENT DOCUMENTS

| CA | 2822252 A1 | 6/2012 |
| EP | 1987722 A1 | 11/2008 |
| JP | 02234651 A * | 9/1990 |
| JP | 08-089175 | 4/1996 |
| JP | H8-89175 * | 4/1996 |
| WO | 2012/084148 A1 | 6/2012 |
| WO | 2014/048867 A1 | 4/2014 |

OTHER PUBLICATIONS

International Search Report from related application PCT/EP2013/069688, dated Jan. 20, 2014, pp. 1-2.
Sentko, et al.; Isomaltulose; Sweetners and Sugar Alternatives in Food Technology, Second Edition; John Wiley & Sons, 2012. (Oct. 7, 2012); paragraph 18.7.3.5.
Japanese Office Action, dated May 10, 2016, in related pending Japanese Application No. 2015-533549, pp. 1-11.

* cited by examiner

*Primary Examiner* — Kelly Bekker
(74) *Attorney, Agent, or Firm* — Durham Jones & Pinegar; Christopher L. Wight; Randall B. Bateman

(57) ABSTRACT

The prevent invention relates to a fondant comprising a sugar system made up of a first non-crystalline phase and a second crystalline phase, wherein the non-crystalline phase contains isomaltulose and sucrose and wherein the crystalline phase contains isomaltulose. The invention also relates to a method for the production thereof, the use of the fondant as icing, coating or filling for baked goods and baked goods that are completely or partially coated with the fondant according to the invention.

15 Claims, No Drawings

FONDANT HAVING A NON-CRYSTALLINE PHASE COMPRISING ISOMALTULOSE AND SUCROSE

FIELD OF INVENTION

The prevent invention relates to fondants used as icing, coating, or filling for baked goods.

BACKGROUND

Fondant or confectioner's sugar is used to produce conventional pastry icings. The adding of additional ingredients such as other sugars, fats, sugar alcohols, thickeners, emulsifiers, dyes and flavors is possible.

Fondants are soft, pasty sugar compounds that are used themselves to produce various confections, as a filling, or as icing for foodstuffs and luxury foods. To produce a fondant, sucrose, glucose syrup, inverted sugar creams, and/or sugar alcohols, and water are used, for example. The compound is boiled and then processed into a soft paste via strong kneading and quick cool-down. Flavors or also foodstuff dyes can also be subsequently added. Fondant is usually produced by supersaturating a sugar solution, particularly a sucrose solution. Excess sucrose is dissolved in hot water, wherein the sugar remains dissolved once the solution cools down and thus forms a supersaturated solution. If seed crystals are added to a supersaturated solution, the dissolved sucrose precipitates out as crystals.

Before being used as icing on baked goods, for example, a fondant comprises a two-phase sugar system made up of a sugar-containing liquid—thus non-crystalline phase—and a phase containing crystalline sugar. In the prior art, the crystalline sugar in the fondant is created by precipitating out crystals from the liquid phase.

Fondant icing is often used to glaze baked goods or pastries, for example donuts. If a fondant based purely on sucrose is used, the storage stability or, respectively, the shelf life of the pastry is greatly limited since sucrose has a hygroscopic effect and the icing therefore becomes gooey during storage. In addition to fondants made of sucrose, fondants made of trehalose are also known in the prior art. Due to a high water content, however, trehalose as a solid tends to clump together and is therefore disadvantageous during processing.

DE 10 2010 055 577 A1 describes an isomaltulose-containing fondant having a non-crystalline phase made of glucose syrup. JP H8-89175 A describes various fondants based on isomaltulose or isomalt.

To summarize, conventional icings may become gooey because the moisture from the pastry migrates into the icing and/or the ambient humidity is absorbed into the packaging due to the hygroscopic property of the sucrose and other sugars (fructose, glucose). If the icing becomes gooey, it runs down the pastry and collects at the base of the packaging, which will reduce the microbiological stability. The pastry can also become dry due to this. In addition, conventional transparent icings may not remain transparent because the moisture from the icing migrates to a sweet pastry (for example a donut), such that the solubility of the sugar in the icing is reduced and may result in crystallization of the present sugar (blooming), and therefore to a clouding.

SUMMARY OF INVENTION

The present invention addresses the above problems in the prior art by providing a fondant having high storage stability and low hygroscopicity after use (for example as an icing), and that is particularly suitable for use as a less gooey, preferably glossy, transparent foodstuff coating or as a filling.

In another aspect, the present invention further provides a fondant enabling a transparent icing—particularly an icing whose transparency is long-lasting—and an improved and simplified production method for such a fondant. In doing so, the fondant should preferably have sufficient sweetness, particularly without requiring that additional sweeteners necessarily be added.

In another aspect, the present invention further provides a fondant comprising a first non-crystalline phase and a second crystalline phase, wherein the non-crystalline phase contains isomaltulose and sucrose and wherein the crystalline phase contains isomaltulose.

In yet another aspect, the present invention further provides a fondant comprising a sugar system made up of a first non-crystalline phase and a second crystalline phase, wherein the non-crystalline phase contains isomaltulose and sucrose and wherein the crystalline phase contains isomaltulose.

In another aspect of the invention, the proportion of isomaltulose to sucrose in the non-crystalline phase (based on the total weight of the isomaltulose and sucrose in the non-crystalline phase) ranges from 20 to 80 to 45 to 55. In another aspect of the invention, the proportion of isomaltulose to sucrose in the non-crystalline phase (based on the total weight of the isomaltulose and sucrose in the non-crystalline phase) ranges from 25 to 75 through 45 to 55. In another aspect of the invention, the proportion of isomaltulose to sucrose in the non-crystalline phase (based on the total weight of the isomaltulose and sucrose in the non-crystalline phase) ranges from 20 to 80 through 40 to 60. In another aspect of the invention, the proportion of isomaltulose to sucrose in the non-crystalline phase (based on the total weight of the isomaltulose and sucrose in the non-crystalline phase) ranges from 25 to 75 through 40 to 60. In another aspect of the invention, the proportion of isomaltulose to sucrose in the non-crystalline phase (based on the total weight of the isomaltulose and sucrose in the non-crystalline phase) ranges from 25 to 75 through 35 to 65.

In another aspect of the invention, the proportion of isomaltulose to sucrose in the fondant (based on the total weight of the isomaltulose and sucrose in the fondant) is at least 25 to 75. In another aspect of the invention, the proportion of isomaltulose to sucrose in the fondant (based on the total weight of the isomaltulose and sucrose in the fondant) is no more than 85 to 15. In another aspect of the invention, the proportion of isomaltulose to sucrose in the fondant (based on the total weight of the isomaltulose and sucrose in the fondant) ranges from 25 to 75 through 85 to 15.

In another aspect of the invention, the proportion of isomaltulose to sucrose in the fondant (based on the total weight of the isomaltulose and sucrose in the fondant) is at least 30 to 70. In another aspect of the invention, the proportion of isomaltulose to sucrose in the fondant (based on the total weight of the isomaltulose and sucrose in the fondant) is no more than 75 to 25. In another aspect of the invention, the proportion of isomaltulose to sucrose in the fondant (based on the total weight of the isomaltulose and sucrose in the fondant) ranges from 30 to 70 through 75 to 25.

In another aspect of the invention, the proportion of isomaltulose to sucrose in the fondant (based on the total weight of the isomaltulose and sucrose in the fondant) is no more than 70 to 30. In another aspect of the invention, the proportion of isomaltulose to sucrose in the fondant (based on the total weight of the isomaltulose and sucrose in the fondant) ranges from 30 to 70 through 70 to 30.

In another aspect of the invention, the proportion of isomaltulose to sucrose in the fondant (based on the total weight of the isomaltulose and sucrose in the fondant) is at least 35 to 65. In another aspect of the invention, the proportion of isomaltulose to sucrose in the fondant (based on the total weight of the isomaltulose and sucrose in the fondant) is no more than 65 to 35. In another aspect of the invention, the proportion of isomaltulose to sucrose in the fondant (based on the total weight of the isomaltulose and sucrose in the fondant) ranges from 35 to 65 through 65 to 35.

In another aspect of the invention, the proportion of isomaltulose to sucrose in the fondant (based on the total weight of the isomaltulose and sucrose in the fondant) is at least 50 to 50. In another aspect of the invention, the proportion of isomaltulose to sucrose in the fondant (based on the total weight of the isomaltulose and sucrose in the fondant) is no more than 70 to 30. In another aspect of the invention, the proportion of isomaltulose to sucrose in the fondant (based on the total weight of the isomaltulose and sucrose in the fondant) ranges from 50 to 50 through 85 to 15.

In another aspect of the invention, the proportion of isomaltulose to sucrose in the fondant (based on the total weight of the isomaltulose and sucrose in the fondant) is at least 55 to 45.

In another aspect of the invention, the proportion of isomaltulose to sucrose in the non-crystalline phase (based on the total weight of the isomaltulose and sucrose in the non-crystalline phase) ranges from 20 to 80 through 45 to 55, wherein simultaneously the proportion of isomaltulose to sucrose in the fondant (based on the total weight of the isomaltulose and sucrose in the fondant) ranges from 30 to 70 through 85 to 15.

DETAILED DESCRIPTION

In the context of the present invention, the percentile proportions of the individual components indicated for a composition of components add up to 100%, i.e. the total composition, unless stated and/or obviously otherwise.

In the context of the present invention, the term "fondant" is understood to be a two-phase sugar composition, wherein the first phase is a non-crystalline phase and the second phase is a crystalline phase. According to the invention, a fondant is, among other things, usable as an icing or coating for foodstuffs, particularly baked goods and confections, wherein the fondant is thereby applied to the foodstuffs and subsequently dried. Before said use, the fondant is present in two-phase form as stated, wherein a person skilled in the art can determine the quantity proportions of the phases and the carbohydrates respectively contained therein, particularly sugars such as sucrose and isomaltulose. After application and drying, the fondant becomes an icing that is no longer two-phase. Unless stated otherwise, within the context of this invention the term "fondant" refers to the two-phase sugar composition before its use as (for example) icing or, respectively, before being dried.

Within the context of the present invention, the term "sugar system" is understood to be a mixture of at least two different sugars. Within the contact of the present invention, the phrase "sugar system comprising a crystalline phase and a non-crystalline phase" refers, to a mixture of at least two sugars, wherein one of the sugars is at least partially crystalline and at least one of the other sugars is at least partially—particularly primarily or entirely—non-crystalline, and is present particularly as a syrup, solution, or especially a saturated solution.

Surprisingly, it has been shown that the desired icing properties could be improved via a suitable mixing ratio comprising isomaltulose and sucrose while using the physical/chemical properties and particularly also via application of a special production method.

It is been shown that the fondant according to the invention and the production method according to the invention can create an icing that is less gooey and can optionally also be transparent, and also will retain these properties for up to 8 days in the packaged state.

The low solubility of a sugar causes a high aw value, a reduced microbiological stability and increased risk of crystallization. The high solubility of a sugar causes a low aw value, an increased microbiological stability and reduced risk of crystallization.

The low hygroscopicity of a sugar causes low sensitivity to increased ambient humidity, a lesser degree of stickiness and improved packaging stability. The high hygroscopicity of a sugar causes high sensitivity to increased ambient humidity, a greater degree of stickiness and reduced packaging stability.

Surprisingly, it has been shown that the aw value of the icings or coatings produced from the fondants can be modified and set via the isomaltulose/sucrose ratios used in the fondants according to the invention.

In a particularly surprising manner it has been shown that, due to the isomaltulose/sucrose ratios used in the fondants according to the invention, the icings or coatings produced from the fondants have an aw value that is similar or identical to that of pastries. In this manner, the migration of moisture from the icing/coating to the pastry or from the pastry to the icing/coating can advantageously be reduced or suppressed.

The water activity (also known as aw value or Activity of Water) is an indicator of the freely available water in a material. It is defined as the ratio of the water vapor pressure in a material (p) to the water vapor pressure of pure water (p0) at a certain temperature. The aw value is normally considered an indicator of the shelf life of foodstuffs and influences the occurrence of microorganisms (spoilage microorganisms), which have differing demands on the freely available water.

Pastries, particularly deep-fried pastries, typically have an aw value of less than 0.95 and greater than 0.88. Donuts, for example, often have an aw value of about 0.91. It is now been shown that icings and coatings having such an aw value of less than 0.95 and greater than 0.88 can be achieved via the isomaltulose/sucrose ratios used according to the invention in the fondant, and particularly in the non-crystalline phase of the fondant. If pastries (particularly deep-fried pastries, especially donuts) are therefore combined with a fondant according to the invention (in particular if the fondant according to the invention is applied to such a pastry), a pastry with an icing or a coating is achieved in which the aw values of the pastry and the icing or the coating are similar or identical. In the context of the present invention, "similar aw values" preferably means a difference in the aw values of no more than 0.03, especially preferably a difference in the aw values of no more than 0.02. This will reduce or suppress the water migration between the icing or, respectively, the coating and the pastry so that the icing will not become sticky or crystallized over a longer timeframe, and the pastry also does not dry out due to increased dehydration. Given a transparent icing or a transparent coating, it is thereby especially advantageous if the contained sugar does not become crystallized, because otherwise the transparency is lost and the icing or the coating is no longer transparent and becomes milky.

The synergistic effect thus results that the icing or the coating on the one hand is less sticky during storage, and on the other hand remains transparent as needed.

In another aspect of the invention, the non-crystalline phase of the fondant according to the invention has an aw value of less than 0.95. In another aspect of the invention, the non-crystalline phase of the fondant according to the invention has an aw value of greater than 0.87. In another aspect of the invention, the non-crystalline phase of the fondant according to the invention has an aw value between 0.87 and 0.95. In another aspect of the invention, the non-crystalline phase of the fondant according to the invention has an aw value between 0.89 and 0.93. In a preferred embodiment, the non-crystalline phase of the fondant according to the invention has an aw value of about 0.91.

Surprisingly, it has also been shown that the aw value of the non-crystalline phase is not influenced by adding the isomaltulose in the crystalline phase.

It has also surprisingly been shown that the quantity proportions of sucrose and isomaltulose that are used according to the invention are sufficient for achieving sufficient sweetness of the fondant. Fondants according to the invention have about 50 to 70% of the sweetness potency of sucrose-based fondants. This results in a sweetness that is perceived to be pleasant and not too weak and that does not have to be enhanced. This is not the case when using trehalose. If needed, however, the sweetness can also be enhanced via the addition of fructose or sweeteners, for example.

In another aspect of the invention, the proportion of the non-crystalline phase in the total carbohydrate composition of the fondant (weight TS of the non-crystalline phase in relation to the total weight TS of the carbohydrates in the fondant) is from 30 to 70% by weight.

In the context of the present invention, "TS" refers to the dry substance. In the context of the present invention, "total weight TS of the carbohydrates" refers to the total weight of all sugars and sugar alcohols contained in the respective reference product, thus for example "non-crystalline phase," "crystalline phase," or "fondant." If the respective reference product does not contain any sugar alcohols, the term "carbohydrates" refers to sugar. Accordingly, the phrase "total weight TS of the carbohydrates" may be replaced by "total weight TS of the sugars."

Isomaltulose is a low-glycemic sucrose isomer which is also known under the name Palatinose™. In comparison to sucrose, isomaltulose has a sweetness potency of 40%. The solubility of isomaltulose is 32 g per 100 g water at 20° C., whereas sucrose has a solubility of 67 g per 100 g water. Contrary to sucrose, isomaltulose is only mildly hygroscopic. Isomaltulose is usually produced enzymatically via fermentation and is non-cariogenic. In a preferred embodiment, isomaltulose is used in the form of crystalline isomaltulose, wherein in a preferred form this can be present in powdered form. It is especially preferable if Palatinose™ PST-N (i.e. isomaltulose having a crystal particle size of 90% by weight <0.7 mm) or Palatinose™ PST-PA (i.e. an isomaltulose having a crystal particle size of 90% by weight <0.05 mm) is used. Alternatively, Palatinose™ PST-PF (i.e. isomaltulose having a crystal particle size of 90% by weight <0.1 mm) or Palatinose™ PAP-N (i.e. an isomaltulose having a crystal particle size of 90% by weight <0.7 mm) may also be used. Alternatively, the isomaltulose in the crystalline phase has a crystalline particle size of from 1 to 100 µm, from 10 to 90 µm, 20 to 80 µm, 30 to 80 µm, 40 to 80 µm, or from 50 to 80 µm, or from 10 to 60 µm, or from 20 to 60 µm, or from 30 or 60 µm, or from 10 to 50 µm, or from 20 to 50 µm. The fondant according to the invention may in some embodiments have a crystal particle size of the isomaltulose in the crystalline phase of 90% by weight <0.7 mm. The fondant according to the invention may in some embodiments have a crystal particle size of the isomaltulose in the crystalline phase of 80% by weight >0.1 mm. The use of crystalline isomaltulose in these particle sizes leads to transparent fondants. Advantageously, isomaltulose as a solid with these crystal particle sizes has less of a tendency to clump together since the water content in an embodiment is only about 5%. This enables a better processing capability as compared to solely using trehalose in a fondant, the water content of which can be 10%.

In another aspect of the invention, the crystalline phase is coarse-grained. Small crystals degrade the transparency of the icing while coarse crystals will increase the transparency of the icing. Thus, it is desirable to use a coarse-grain crystalline phase if a transparent icing or a transparent coating is to be obtained from the fondant according to the invention.

In another aspect of the invention, at least 50% by weight or more preferably at least 75% by weight of the crystals in the crystalline phase have a granule size of at least 0.1 mm.

In another aspect of the invention, at least 80% by weight of the isomaltulose crystals in the crystalline phase have a granule size of at least 0.08 mm.

In another aspect of the invention, at least 80% by weight of the crystals in the crystalline phase have a granule size of at least 0.1 mm. In another aspect of the invention, at least 80% by weight of the isomaltulose crystals in the crystalline phase have a granule size of at least 0.1 mm.

Surprisingly, it has been found that the fondant made according to the invention results in a particularly homogenous, glossy, and transparent icing with coarse crystals on foodstuffs, for example baked goods, particularly deep-fried pastries. Even when using the fondants at 40 to 55° C.—for example on hot deep-fried pastries—quick drying of the icing on the pastry is ensured. Furthermore, the storage stability of the fondant according to the invention is increased significantly and the hygroscopicity is low. Advantageously, a coating resulting from the fondant according to the invention will absorb little to no water at all from the interior of the coated product and the ambient air. When used as a coating (for example as a glaze, thus a transparent coating), an especially low stickiness results.

In another aspect of the invention, at least 90% by weight of the crystals in the crystalline phase have a granule size of no more than 0.7 mm. In another aspect of the invention, at least 90% by weight of the isomaltulose crystals in the crystalline phase have a granule size of no more than 0.7 mm.

In another aspect of the invention, the non-crystalline phase contains at least 20% by weight isomaltulose (weight TS of the isomaltulose in the non-crystalline phase in relation to the total weight TS of the carbohydrates in the non-crystalline phase). In another aspect of the invention, the non-crystalline phase contains at most 45% by weight isomaltulose (weight TS of the isomaltulose in the non-crystalline phase in relation to the total weight TS of the carbohydrates in the non-crystalline phase).

In another aspect of the invention, the carbohydrate proportion of the non-crystalline phase is formed by at least 50% by weight of a mixture of isomaltulose and sucrose.

In another aspect of the invention, the carbohydrate portion of the crystalline phase is formed by at least 50% by weight isomaltulose.

In another aspect of the invention, the fondant has isomaltulose and sucrose as the only sugars. In another aspect of the invention, the fondant has no additional sugars or only traces of other sugars in addition to isomaltulose and sucrose.

In another aspect of the invention, the fondant contains no more than 3% by weight glucose syrup.

In an alternative embodiment, the fondant contains fructose, preferably in small quantities. In another aspect of the invention, the fondant contains no more than 3% by weight fructose. If necessary, the sweetness potency can be enhanced by the fructose.

The fondant may also contain polydextrose, preferably in small quantities, or particularly in a quantity of no more than 3% by weight. The fondant may also contain dextrins/maltodextrins (for example Nutriose®), preferably in small quantities, or particularly in a quantity of no more than 3% by weight.

In an alternative embodiment, the crystalline phase only contains traces of trehalose. In a preferred embodiment, the crystalline phase contains less than 1% by weight trehalose.

In another aspect of the invention, the crystalline phase contains no trehalose.

In another aspect of the invention, the fondant only contains traces of trehalose. In another aspect of the invention, the fondant contains less than 1% by weight trehalose. In another aspect of the invention, the fondant contains no trehalose.

In another aspect of the invention, the fondant may also contain trehalose in the crystalline phase, in addition to isomaltulose. In one embodiment, the fondant may contain additional sugars—for example trehalulose—in addition to the previously mentioned sugars, namely isomaltulose, sucrose, and trehalose.

In another aspect of the invention, the fondant may also contain trehalose in the non-crystalline phase, in addition to sucrose and isomaltulose.

In another aspect of the invention, the fondant contains no sugar alcohols. In another aspect of the invention, the fondant only contains traces of sugar alcohols. Alternatively, however, the fondant may also contain sugar alcohols.

In another aspect of the invention, the fondant does not have any sweetness potency enhancer or intensive sweetener. In an alternative embodiment of the present invention, the fondant only has traces of a sweetness potency enhancer or intensive sweetener. In an alternative embodiment of the present invention, the fondant has 0.0 to 3.0% by weight of at least one sweetness potency enhancer or intensive sweetener (total weight of sweetness potency enhancer or, respectively, intensive sweetener in relation to the dry substance of the fondant).

Nevertheless, the fondant according to the invention advantageously has a taste profile and most of all a sweetness potency that is sufficient for replacing conventional, pure sucrose-containing fondants.

In another aspect of the invention, the fondant does not have any sugar substitutes, particularly no sugar alcohols and/or no intensive sweeteners, or has them only in trace amounts.

Within the context of the present invention, the term "traces" of a substance preferably refers to quantity proportions of less than 1% by weight, particularly less than 0.9% by weight, preferably less than 0.01% by weight.

In another aspect of the invention, the fondant contains 0.9 to 50% by weight water (in relation to the total weight of the fondant). In another aspect of the invention, the fondant contains 5 to 45% by weight water (in relation to the total weight of the fondant).

In another aspect of the invention, the fondant according to the invention contains from 10 to 40% by weight, preferably 15 to 35% by weight, especially preferably 10 to 30, preferably 15 to 30% by weight, particularly 15 to 25% by weight, especially 20 to 25% by weight water (in relation to the total weight of the fondant), particularly in the non-crystalline phase.

The quantity proportion of water preferably relates to the water added, but not to the water of crystallization contained in the sugars.

In another aspect of the invention, the fondant contains 0.01 to 1.0% by weight (total weight thickening agent in relation to TS of the fondant) thickening agent. In another aspect of the invention, the fondant contains 0.01 to 0.6% by weight (total weight thickening agent in relation to TS of the fondant) thickening agent. In another aspect of the invention, the fondant contains 0.01 to 0.3% by weight, preferably 0.01 to 0.2% by weight, particularly 0.01 to 0.1% by weight (total weight thickening agent in relation to the dry substance of the fondant) of one or more thickening agents. The thickening agent may be selected from the group consisting of agar, carrageen, and xanthan. In another aspect of the invention, Agar is the thickening agent. The use of at least one thickening agent is of particular advantage, especially for using the fondant as a coating fondant. Advantageously, the recrystallization of components of the sugar system is prevented and the flexibility and stability of the coating is ensured, even over a longer time period. Moreover, the use of at least one thickening agent advantageously leads to an improved binding of the fondant to the foodstuff, particularly pastry. The binding of the crystals in the fondant can thereby also be improved.

In another aspect of the invention, the fondant contains 0.01 to 3% by weight (in relation to TS of the fondant) of at least one preservative approved for foodstuffs, at least one flavor, or both.

In another aspect of the invention, the fondant contains 0.01 to 3% by weight (total weight of acid in relation to TS of the fondant) of at least one organic acid approved for foodstuffs, one flavor, or both. The fondant according to the invention preferably contains 0.01 to 3% by weight, 0.01 to 1% by weight, or 0.01 to 0.8% by weight (total weight of acid in relation to the dry substance of the fondant) of an organic acid approved for foodstuffs, a flavor, or both. The organic acid approved for foodstuffs may be citric acid, sorbic acid, or lactobionic acid. The acids may also be added in the form of their salts, of course. The fondant according to the invention may contain 0.01 to 3% by weight, 0.01 to 1% by weight, or 0.01 to 0.8% by weight (total weight of acid in relation to the dry substance of the fondant) citric acid. Such products are characterized by an especially balanced taste profile.

The fondant according to the invention may contain potassium sorbate. The fondant according to the invention may contain 0.01 to 3% by weight, 0.01 to 1% by weight, or 0.01 to 0.8% by weight (total weight of acid in relation to the dry substance of the fondant) potassium sorbate.

It may also be provided that the fondant according to the invention contains food coloring.

In another aspect of the invention, a transparent glaze is formed from the fondant according to the invention. In another aspect of the invention, the fondant according to the invention is made transparent via drying.

The subject matter of the invention is also a method for producing a fondant, particularly a fondant according to the invention, wherein sucrose in a non-crystalline phase containing isomaltulose and water is dissolved in a first method step and, in a second method step, crystalline isomaltulose is added to the solution obtained in the first method step, thus obtaining a fondant.

In another aspect of the invention, the sucrose is added to a saturated isomaltulose solution in a first method step. By adding the sucrose, a small part of the dissolved isomaltulose is displaced and precipitated out as crystals. However, this quantity proportion of crystallized isomaltulose is very small and negligible in comparison to the quantity proportion of crystalline isomaltulose added in the second method step that does not dissolve in solution.

The method differs from conventional methods particularly in that the crystalline phase is not obtained via the precipitation of crystals, but rather via addition of crystalline isomaltulose to the non-crystalline phase. The crystalline isomaltulose does not dissolve, but rather remains in the crystalline phase.

The precipitation of crystals in conventional methods only results in fine crystals. However, these are not suitable for producing transparent icings from the fondants. However, by adding the isomaltulose crystals according to the invention, the crystal size can advantageously be freely selected and thus the later appearance of the icing formed from the fondant can be determined. Coarse isomaltulose crystals may also be added in the second method step so that a transparent icing can result from the fondant obtained.

In another aspect of the invention, crystalline isomaltulose is added in the second step, wherein at least 50% by weight, more preferably at least 75% by weight of the crystals have a granule size of at least 0.1 mm.

In another aspect of the invention, at least 80% by weight of the isomaltulose crystals have a granule size of at least 0.08 mm. In another aspect of the invention, at least 80% by weight of the crystals have a granule size of at least 0.1 mm. In another aspect of the invention, at least 80% by weight of the isomaltulose crystals have a granule size of at least 0.1 mm.

Preferred quantities and proportions of isomaltulose, sucrose, and other carbohydrates, sugars, and substances in the method according to the invention result from the preferred specifications for the fondant according to the invention.

In another aspect of the invention, if the sucrose is added to the non-crystalline phase in the first method step and the crystalline isomaltulose is added to the non-crystalline phase in the second method step in quantity proportions such that the proportions between the isomaltulose and sucrose in the non-crystalline phase (in relation to the total weight of the isomaltulose and sucrose in the non-crystalline phase) ranges from 20 to 80 through 45 to 55, wherein at the same time the proportion between the isomaltulose and the sucrose in the fondant (in relation to the total weight of the isomaltulose and the sucrose in the fondant) ranges from 30 to 70 through 85 to 15.

In another aspect of the invention, crystalline sucrose is dissolved in the first step.

In another aspect of the invention, the first method step includes the following sub-steps: —adding a thickening agent to the non-crystalline phase; —heating the non-crystalline phase to 80 to 98° C.; —dissolving sucrose in the non-crystalline phase; —lowering the temperature in the non-crystalline phase to 40 to 70° C., particularly preferably to 55 to 65° C.;

In another aspect of the invention, in the second step the crystalline isomaltulose is added to the solution obtained in the first method step at a temperature of from 40 to 70° C., especially preferably at a temperature of from 55 to 65° C.

In another aspect of the invention, the method includes the following steps:

a) adding a thickening agent to the non-crystalline phase, containing isomaltulose and water;
b) heating the non-crystalline phase to 80 to 98° C. until the thickening agent has dissolved;
c) dissolving the sucrose in the non-crystalline phase;
d) lowering of the temperature of the non-crystalline phase to 40 to 70° C.;
e) adding crystalline isomaltulose to the solution tempered in step d);

wherein a fondant is obtained at the end of the method.

A preferred embodiment of the method additionally includes the following steps:

f) adding at least one preservative and/or at least one organic acid, preferably citric acid and/or potassium sorbate;
g) obtaining a fondant.

In an alternative embodiment, steps e) and f) may be switched. It may thus be provided that the at least one preservative is to be added to the solution tempered in step d) before the crystalline isomaltulose.

In alternative embodiment, at least one flavor may also be added. The at least one flavor may particularly be added in step f) in addition to the at least one preservative and/or the at least one organic acid.

In an alternative embodiment, steps a) and b) are replaced by the following steps a1) and b1):

a1) adding isomaltulose and a thickening agent to water;
b1) heating the water to 80 to 98° C. until the thickening agent and the isomaltulose have dissolved, whereby a non-crystalline phase is obtained.

If necessary, a water loss caused by the heating may be compensated for before the second step or before step c).

The subject matter of the invention is also a fondant, an icing, a coating or a pastry filling that can be obtained according to the method in accordance with the invention. The subject matter of the invention is also a fondant, an icing, or a pastry filling obtained via the method in accordance with the invention. Such a fondant or such a pastry filling may differ from fondants in the prior art due to the crystal size in the crystalline phase and/or due to the quantity distribution of the isomaltulose and sucrose in the non-crystalline phase and/or in the fondant. Such an icing and such a coating may differ from icings and coatings from the prior art due to the crystal size in the crystalline isomaltulose and/or due to the quantity distribution of the isomaltulose and sucrose in the fondant and/or due to a reduced stickiness and longer shelf life.

The subject matter of the invention is also the use of the fondant according to the invention as an icing, coating or filling for foodstuffs or luxury foods, particularly baked goods or confections.

The subject matter of the invention is also particularly the use of the fondant according to the invention as a coating fondant (particularly as a glaze) for deep-fried pastries, for example donuts. In another aspect of the invention, the fondant according to the invention is used for glazing baked goods, particularly deep-fried pastries, donuts, cakes, pies, cookies, waffles, pastry shop products, bakery shop products or the like.

Foodstuff or luxury food, particularly baked good or confection, which is completely or partially coated with a fondant according to the invention. Foodstuff or luxury food which is completely or partially coated with an icing or a coating obtained from a fondant according to the invention. The subject matter of the invention is also a foodstuff and luxury food, particularly a baked good, which has been completely or partially coated with the fondant according to the invention, wherein the fondant is preferably transparent as a glaze after the coating and drying.

In another aspect of the invention, the foodstuffs and luxury foods are baked goods, particularly deep-fried pastries, donuts, cakes, pies, cookies, waffles, pastry shop products, bakery shop products or the like.

However, the present invention alternatively relates as well to the use of the fondant according to the invention as a filling, particularly in foodstuffs and luxury foods, especially in confections, particularly confections such as sweets or pastry shop products. In another aspect of the invention, the fondant from the present invention may therefore be used as a filling of, for example, chocolate products, pastry shop products, bakery shop products, filled chocolate candies, confectionery products or the like.

The subject matter of the invention is also a foodstuff or luxury food, particularly confections containing a fondant according to the present invention.

Additional advantageous embodiments of the invention result from the dependent Claims.

EXAMPLES

The present invention is further explained in the following examples, wherein these are to be understood as non-limiting.

Example 1: Production Method for a Fondant According to the Invention a) produce a saturated isomaltulose solution
b) add agar-agar as a thickening agent to the saturated isomaltulose solution and heat to 95° C.
c) keep the preparation at 95° C. for 2 minutes in order for the thickening agent (agar-agar) to completely dissolve; subsequently compensate for water loss
d) add sucrose to sample and dissolve; maintain temperature at about 60° C. (step for reducing aw value)
e) add the crystalline isomaltulose at 60° C.; the crystals do not dissolve; the temperature reduces to about 50° C.
f) add citric acid and potassium sorbate Example 2: Formulations Formulation 1:
Isomaltulose for saturated solution: 10.8 g
Isomaltulose for crystalline phase: 37.6 g
Sucrose: 30.6 g
Water: 20.5 g
Agar-agar: 0.3 g
Citric acid: 0.1 g
Potassium sorbate: 0.1 g
Formulation 2:
Isomaltulose for saturated solution: 10.8 g
Isomaltulose for crystalline phase: 41.5 g
Sucrose: 26.7 g
Water: 20.5 g
Agar-agar: 0.3 g
Citric acid: 0.1 g
Potassium sorbate: 0.1 g
Formulation 3:
Isomaltulose for saturated solution: 10.8 g
Isomaltulose for crystalline phase: 45.3 g
Sucrose: 22.9 g
Water: 20.5 g
Agar-agar: 0.3 g
Citric acid: 0.1 g
Potassium sorbate: 0.1 g
Formulation 4:
Isomaltulose for saturated solution: 10.8 g
Isomaltulose for crystalline phase: 5.7 g
Sucrose: 62.5 g
Water: 20.5 g
Agar-agar: 0.3 g
Citric acid: 0.1 g
Potassium sorbate: 0.1 g
Formulation 5:
Isomaltulose for saturated solution: 10.8 g
Isomaltulose for crystalline phase: 60.6 g
Sucrose: 7.6 g
Water: 20.5 g
Agar-agar: 0.3 g
Citric acid: 0.1 g
Potassium sorbate: 0.1 g The weight and quantity specifications are based on g Hg (gram commercial weight). The bound water of crystallization is therefore also included in the specifications for isomaltulose.

The formulations were processed into fondants as shown in Example 1. The fondants were applied to donuts and dried as a glaze.

Formulations 1, 2, 3 lead to glazes that did not become sticky, showed no or hardly any moisture formation, and simultaneously showed no or hardly any worsening in the transparency over a storage time of 8 days.

Example 3: Calculating the Sweetness Potency of Formulation 1

The sweetness potency of isomaltulose is 40%, which results in a factor of 0.4. The sweetness potency of sucrose is 100%, which results in a factor of 1. The calculation of the sweetness potency of formulation 1 is based on the commercial weight (HG).

$$\text{Sweetness potency reference of glaze based on sucrose} = 71.4$$

$$\text{Sweetness potency formulation 1} = \\ (10.8_{\text{quantity Hg isomaltulose saturated solution}} \times 0.4) + \\ (37.6_{\text{quantity Hg isomaltulose crystalline}} \times 0.4) + \\ (30.6_{\text{quantity sucrose}} \times 1)$$

$$\text{Sweetness potency formulation 1} = (4.32) + (15.04) + (30.6)$$

$$\text{Sweetness potency formulation 1} = 49.96$$

The glaze from formulation 1 thus achieves 70% of the sweetness of the reference sample.

The sweetness potency of formulation 1 leads to a pleasant and sufficient sweetness.

Example 4: aw Values for Different Non-Crystalline Phases

| Sample ID | 0 | 1 | 2 | 3 | 4 | 5 | 6 | 7 | 8 | 9 | 10 |
|---|---|---|---|---|---|---|---|---|---|---|---|
| Saturated isomaltulose solution [g] | 100 | 80 | 75 | 70 | 65 | 60 | 55 | 50 | 45 | 40 | 35 |
| Sucrose [g] | 0 | 20 | 25 | 30 | 35 | 40 | 45 | 50 | 55 | 60 | 65 |
| Isomaltulose (measured value, HPLC-NH$_2$) [g/100 g] | 32.2 | 24.3 | 25.9 | 20.8 | 20.3 | 18.1 | 17.1 | 17.7 | 14.4 | 13.7 | 12.1 |
| Sucrose (measured value, HPLC-NH$_2$) [g/100 g] | 0 | 19.6 | 27.8 | 29.0 | 35.0 | 40.4 | 45.1 | 54.6 | 53.1 | 54.5 | 56.7 |
| Dry substance [g/100 g] | 32.2 | 43.9 | 53.7 | 49.8 | 55.3 | 58.5 | 62.2 | 72.3 | 67.5 | 68.2 | 68.8 |
| Water [g/100 g] | 67.8 | 56.1 | 46.3 | 50.2 | 44.7 | 41.5 | 37.8 | 27.7 | 32.5 | 31.8 | 31.2 |
| a$_w$ | 0.95 | 0.95 | 0.95 | 0.94 | 0.93 | 0.92 | 0.91 | 0.90 | 0.89 | 0.87 | 0.84 |

A desired aw value can be set via the ratio of the isomaltulose quantity and sucrose quantity in the non-crystalline phase. Samples 3 to 8, having an aw value of from 0.94 to 0.89, are especially well-suited as glazes for pastries.

The invention claimed is:

1. A fondant comprising a sugar system comprising a first non-crystalline phase and a second crystalline phase, wherein the non-crystalline phase contains isomaltulose and sucrose and wherein the crystalline phase contains isomaltulose, wherein the non-crystalline phase contains at least 20% by weight isomaltulose (weight total solids of the isomaltulose in the non-crystalline phase based on the total weight total solids of the carbohydrates in the non-crystalline phase), wherein the percentage proportion of isomaltulose to sucrose in the non-crystalline phase (based on the total weight of the isomaltulose and sucrose in the non-crystalline phase) ranges from 20:80 to 45:55.

2. The fondant according to claim 1, wherein the percentage proportion of isomaltulose to sucrose in the fondant (based on the total weight of the isomaltulose and sucrose in the fondant) ranges from 25:75 to 85:15.

3. The fondant according to claim 1, wherein the proportion of the non-crystalline phase in the total carbohydrate composition of the fondant (weight total solids of the non-crystalline phase based on the total weight total solids of the carbohydrates in the fondant) is from 30 to 70% by weight.

4. The fondant according to claim 1, wherein at least 80% by weight of the crystals in the crystalline phase have a granule size of at least 0.1 mm.

5. The fondant according to claim 1, wherein the carbohydrate portion of the non-crystalline phase is at least 50% by weight of a mixture of isomaltulose and sucrose.

6. The fondant according to claim 1, wherein the fondant contains no more than 3% by weight glucose syrup.

7. The fondant according to claim 1, wherein the fondant contains 10 to 40% by weight water (based on the total weight of the fondant).

8. The fondant according to claim 1, wherein the fondant contains 0.01 to 0.6% by weight thickening agent (total weight thickening agent based on the total solids of the fondant).

9. The fondant according to claim 1, wherein the fondant contains 0.01 to 3% by weight of at least one preservative approved for foodstuffs, at least one flavor, or both (based on the total solids of the fondant).

10. A method for producing a fondant comprising a sugar system comprising a first non-crystalline phase and a second crystalline phase, wherein the non-crystalline phase contains isomaltulose and sucrose and wherein the crystalline phase contains isomaltulose, wherein the non-crystalline phase contains at least 20% by weight isomaltulose (weight total solids of the isomaltulose in the non-crystalline phase based on the total weight total solids of the carbohydrates in the non-crystalline phase), wherein the percentage proportion of isomaltulose to sucrose in the non-crystalline phase (based on the total weight of the isomaltulose and sucrose in the non-crystalline phase) ranges from 20:80 to 45:55, the method comprising: (i) dissolving sucrose in a non-crystalline phase containing isomaltulose and water to obtain a solution, and (ii) adding crystalline isomaltulose to the solution.

11. The method according to claim 10, wherein the step of dissolving sucrose in a non-crystalline phase containing isomaltulose and water comprises the following sub-steps:
adding a thickening agent to the non-crystalline phase;
heating the non-crystalline phase to 80 to 98° C.;
dissolving the sucrose in the non-crystalline phase; and
lowering the temperature of the non-crystalline phase to 40 to 70° C.

12. The method according to claim 10, wherein the crystalline isomaltulose is added to the solution at a temperature of from 40 to 70° C.

13. The method according to claim 11, wherein the crystalline isomaltulose is added to the solution at a temperature of from 40 to 70° C.

14. A method of preparing a baked good or confection comprising the step of icing, coating or filling a foodstuff with a fondant comprising a sugar system comprising a first non-crystalline phase and a second crystalline phase, wherein the non-crystalline phase contains isomaltulose and sucrose and wherein the crystalline phase contains isomaltulose, wherein the non-crystalline phase contains at least 20% by weight isomaltulose (weight total solids of the isomaltulose in the non-crystalline phase based on the total weight total solids of the carbohydrates in the non-crystalline phase), wherein the percentage proportion of isomaltulose to sucrose in the non-crystalline phase (based on the total weight of the isomaltulose and sucrose in the non-crystalline phase) ranges from 20:80 to 45:55.

15. A foodstuff coated, iced or filled with a fondant in accordance with claim 1.

* * * * *